(12) United States Patent
Tezuka et al.

(10) Patent No.: US 7,740,349 B2
(45) Date of Patent: Jun. 22, 2010

(54) PRINTER AND PRINTING METHOD

(75) Inventors: Chikao Tezuka, Tomi (JP); Kazutomo Seki, Tomi (JP); Nobuyuki Ono, Nagano (JP)

(73) Assignee: Mimaki Engineering Co., Ltd., Nagano (JP)

( * ) Notice: Subject to any disclaimer, the term of this patent is extended or adjusted under 35 U.S.C. 154(b) by 134 days.

(21) Appl. No.: 12/043,730

(22) Filed: Mar. 6, 2008

(65) Prior Publication Data

US 2008/0218542 A1 Sep. 11, 2008

(30) Foreign Application Priority Data

Mar. 9, 2007 (JP) ............... 2007-059385

(51) Int. Cl.
*B41J 2/01* (2006.01)
(52) U.S. Cl. .................................. 347/101; 347/104
(58) Field of Classification Search .............. 347/8, 347/20, 37, 14, 101
See application file for complete search history.

(56) References Cited

U.S. PATENT DOCUMENTS 6,460,958 B2 * 10/2002 Kubo et al. ............. 347/2
6,709,084 B1 * 3/2004 Nordlund et al. ........ 347/19

FOREIGN PATENT DOCUMENTS

| JP | 2003-191455 | 7/2003 |
|----|-------------|--------|
| JP | 2004-148666 | 5/2004 |

* cited by examiner

*Primary Examiner*—Thinh H Nguyen
(74) *Attorney, Agent, or Firm*—Ditthavong Mori & Steiner, P.C.

(57) ABSTRACT

A printer includes a holding unit, a printer head, a movement controller and a printing controller. The holding unit is configured to hold a print substrate having a surface to be printed. The printer head is configured to eject ink from a plurality of ejection nozzles to the surface. The movement controller is configured to move the holding unit and the printer head relative to each other. The printing controller is configured to control ejection of the ink from the printer head according to a surface curvature of the surface and a relative position of the holding unit and the printer head.

18 Claims, 5 Drawing Sheets

PRINTER AND PRINTING METHOD

CROSS-REFERENCE TO RELATED APPLICATIONS

The present application claims priority under 35 U.S.C. §119 to Japanese Patent Application No. 2007-059385, filed Mar. 9, 2007, entitled "Three-dimensional Printer." The contents of this application are incorporated herein by reference in their entirety.

BACKGROUND OF THE INVENTION

1. Field of the Invention

The present invention relates to a printer, a printing method and a three-dimensional printer.

2. Discussion of the Background

A various printers for printing characters, figures, and the like on a print substrate such as paper are conventionally known. As an example, a printer connected to a computer to perform a printing on a paper has been widely used for business purposes and household purposes. Typical conventional printer is of a style of printing while feeding a paper or a sheet member as a print substrate in a predetermined feeding direction and moving a printer head thereof in a scanning direction perpendicular to the feeding direction. JP-A-2003-191455 and JP-A-2004-148666 disclose such printers. The contents of these publications are incorporated herein by reference in their entirety.

The conventional printers are of a type of performing predetermined printing on a planate sheet material or a flat surface of a solid object, that is, of a type for performing two-dimensional printing. Recently, however, there is a need for a printer capable of performing a printing on an object having a three-dimensional surface (for example, a cylindrical surface, a spherical surface, and other various curved surfaces).

SUMMARY OF THE INVENTION

According to one aspect of the present invention, a printer includes a holding unit, a printer head, a movement controller and a printing controller. The holding unit is configured to hold a print substrate having a surface to be printed. The printer head is configured to eject ink from a plurality of ejection nozzles to the surface. The movement controller is configured to move the holding unit and the printer head relative to each other. The printing controller is configured to control ejection of the ink from the printer head according to a surface curvature of the surface and a relative position of the holding unit and the printer head.

According to another aspect of the present invention, a printing method includes holding a print substrate having a surface to be printed, ejecting ink from a plurality of ejection nozzles to the surface, moving said print substrate held and said plurality of ejection nozzles relative to each other, and controlling ejection of the ink from the plurality of ejection nozzles according to a surface curvature of the surface and a relative position of said print substrate held and said plurality of ejection nozzles.

According to further aspect of the present invention, a three-dimensional printer includes a holding unit, a printer head, a movement controller and a printing controller. The holding unit is configured to hold a print substrate having a three-dimensional surface to be printed. The printer head is configured to eject ink from a plurality of ejection nozzles to the three-dimensional surface. The movement controller is configured to move the holding unit and the printer head relative to each other. The printing controller is configured to control ejection of the ink from the printer head according to a surface curvature of the three-dimensional surface and a relative position of the holding unit and the printer head.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
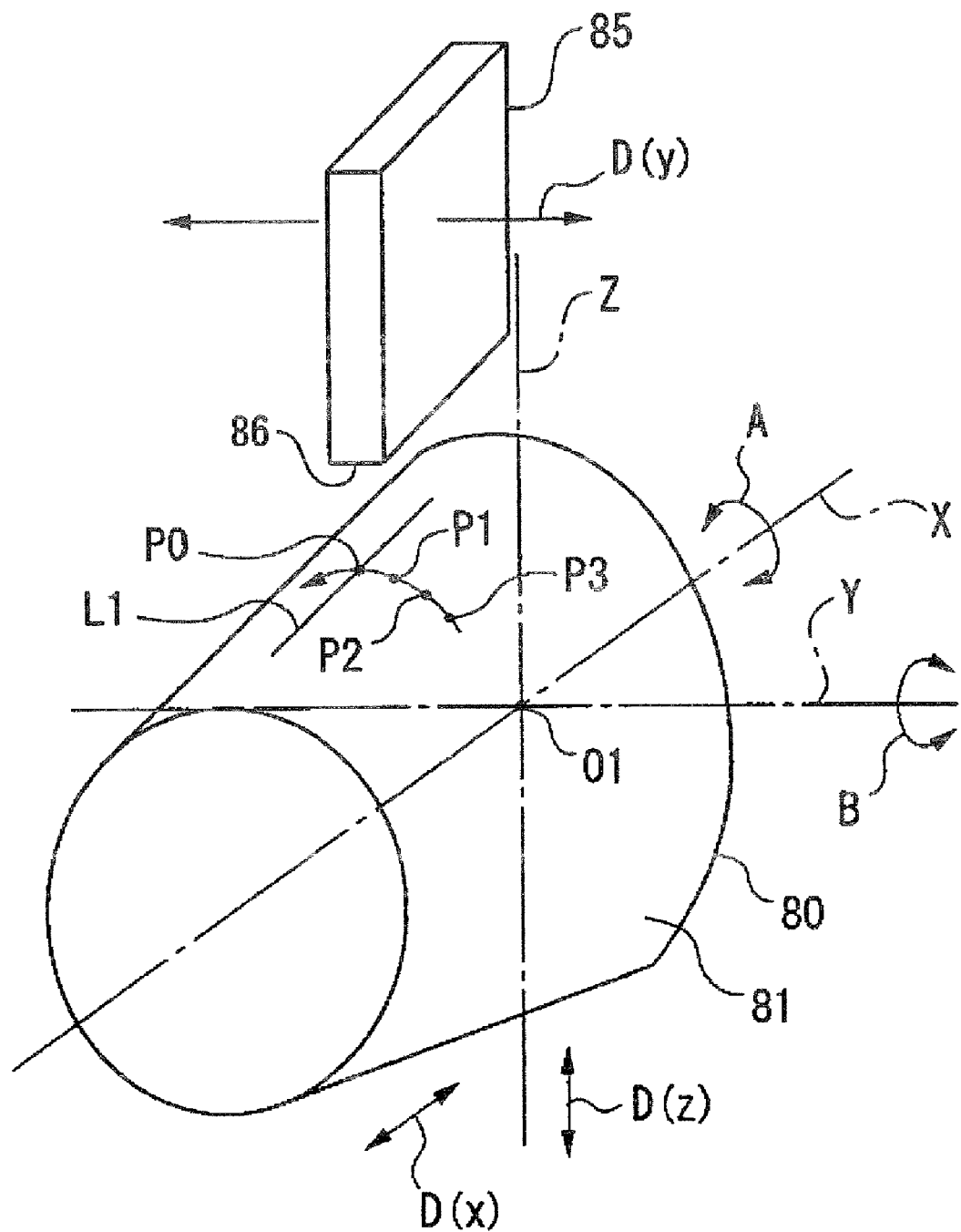
FIG. 1 is a schematic illustration for explaining the operation principle of a printer according to an embodiment of the present invention.

The embodiments will now be described with reference to the accompanying drawings, wherein like reference numerals designate corresponding or identical elements throughout the various drawings.

First, control of relative movement between a print substrate 80 held by a holding unit and a printer head 85 and control of printing in the printer according to an embodiment of the present invention will be briefly described with reference to FIG. 1. The print substrate 80 in FIG. 1 is a member having, for example, a truncated cone shape. Ink is ejected from the printer head (inkjet head) 85 to an outer surface 81 of the truncated cone shape to perform intended printing on the surface. FIG. 1 will be used for describing the operation principle of the printer having the aforementioned arrangement.

The printer has a supporting device for supporting the print substrate 80, but not shown. The supporting device supports the print substrate 80 in such a manner that the central axis X of the truncated cone extends in an anteroposterior direction, the print substrate 80 is rotatable about the axis X (i.e. rotatable in the direction shown by an arrow A), in addition to this state, the print substrate 80 is rotatable about an axis Y extending in a lateral direction perpendicular to the axis X and passing through a point O1 on the axis X (i.e. rotatable in the direction shown by an arrow B), the print substrate 80 is also movable anteroposteriorly along the direction of the axis X (i.e. movable in the direction shown by an arrow D(x)), and further the print substrate 80 is movable vertically along an axis Z extending in a vertical direction perpendicular to the axis X and the axis Y (i.e. movable in the direction shown by an arrow D(z)). The printer head is arranged above the print substrate 80 supported in the aforementioned manner by the supporting device (not shown) in such a manner that the printer head is movable in the directions of the axis Y (i.e. movable in the direction shown by an arrow D(y)). The printer head 85, which is provided with a plurality of ink nozzles formed in a bottom thereof, ejects ink supplied from an ink supplier (not shown) in a state that the ink nozzles are each controlled by a printing controller to perform predetermined printing on the surface 81 of the print substrate 80.

To perform the intended printing on the conical surface 81 of the print substrate 80, supported by the supporting device, by ejecting the ink through the ink nozzles formed in the bottom of the printer head 85, it is necessary to bring the ink nozzles to a position, close to the print substrate 80, facing the surface to be printed of the print substrate 80 and having a predetermined printing distance from the surface to be printed of the print substrate 80 (i.e. a position having an optimum distance for the printing performed by ejecting the ink from the ink nozzles to adhere to the surface 81). It is also necessary to set the ink nozzles formed in the bottom of the printer head 85 such that the ink nozzles fully face the surface to be printed, that is, the ejecting direction of the ink from the ink nozzles becomes substantially perpendicular to the surface 81 so that ejected ink collides with the surface 81 substantially perpendicularly.

For example, in case of ejecting ink from the printer head 85 to a point P0 in FIG. 1 on the surface of the print substrate 80 to perform the printing on the point P0, it is necessary to bring the surface at the point P0 to the position where is spaced apart from the bottom 86 of the printer head 85 just by a predetermined printing distance CL0 and to make the surface of the print substrate 80 at the point P0 substantially parallel to the bottom 86 of the printer head. The predetermined printing distance CL0 is a value as a distance enabling optimum printing on the surface of the print substrate 80 according to the size and the speed (momentum) of ink droplets ejected through the plural ink nozzles formed in the bottom 86 of the printer head to face downward. In other words, a printing controller controls ejection of the ink from the plural ink nozzles according to a surface curvature of the surface to be printed and a relative position of said holding unit and said printer head.

For this, from the state that the print substrate 80 is supported as shown in FIG. 1, the print substrate 80 is moved anteroposteriorly along the direction of the axis X (i.e. moved in the direction shown by the arrow D(x)) and the print substrate 80 is rotated about the axis X (i.e. rotated in the direction shown by the arrow A) until the print point P0 becomes the top of the print substrate 80 and the print point P0 reaches a position directly below the printer head 85. Then, the print substrate 80 is rotated about the axis Y (i.e. rotated in the direction shown by the arrow B) until the ridge line L1 passing through the print point P0 extends horizontally, the printer head 85 is moved along the direction of the axis Y (i.e. moved in the direction shown by the arrow D(y)) until the bottom 86 (nozzles for ejecting ink) of the printer head 85 reaches to a position directly above the print point P0, and the print substrate 80 is moved upward along the direction of the axis Z (moved in the direction of the arrow D(z)) until the bottom 86 (nozzles for ejecting ink) of the printer head 85 reaches a position, close to the print point P0, having just the predetermined printing distance from the print point P0. It should be noted that the moving and rotating order is not limited unless the print substrate 80 and the printer head 85 interfere each other.

The print substrate 80 is rotated about the axis X and the axis Y for the aforementioned movement. The rotational axis X and the rotational axis Y both pass through the point O1 as mentioned above. The point O1 is set to be positioned inside the print substrate 80 supported by the supporting device. As a result of this, the print substrate 80 is adapted to rotate about the axis X and the axis Y passing through the point O1. Therefore, when the print substrate 80 is controlled to move relative to the printer head 85 while maintaining the state that the print substrate 80 faces the bottom 86 of the printer head 85 and is spaced apart from the bottom 86 of the printer head 85 by the predetermined printing distance, the moving range of the print substrate 80 can be narrow so that the supporting device for supporting the print substrate 80 can be made to have a compact structure. Similarly, since the moving range of the printer head 85 can be narrow, the printer head 85 can be made to have a compact structure, thereby making the entire printer to have a compact structure.

Figure 5:
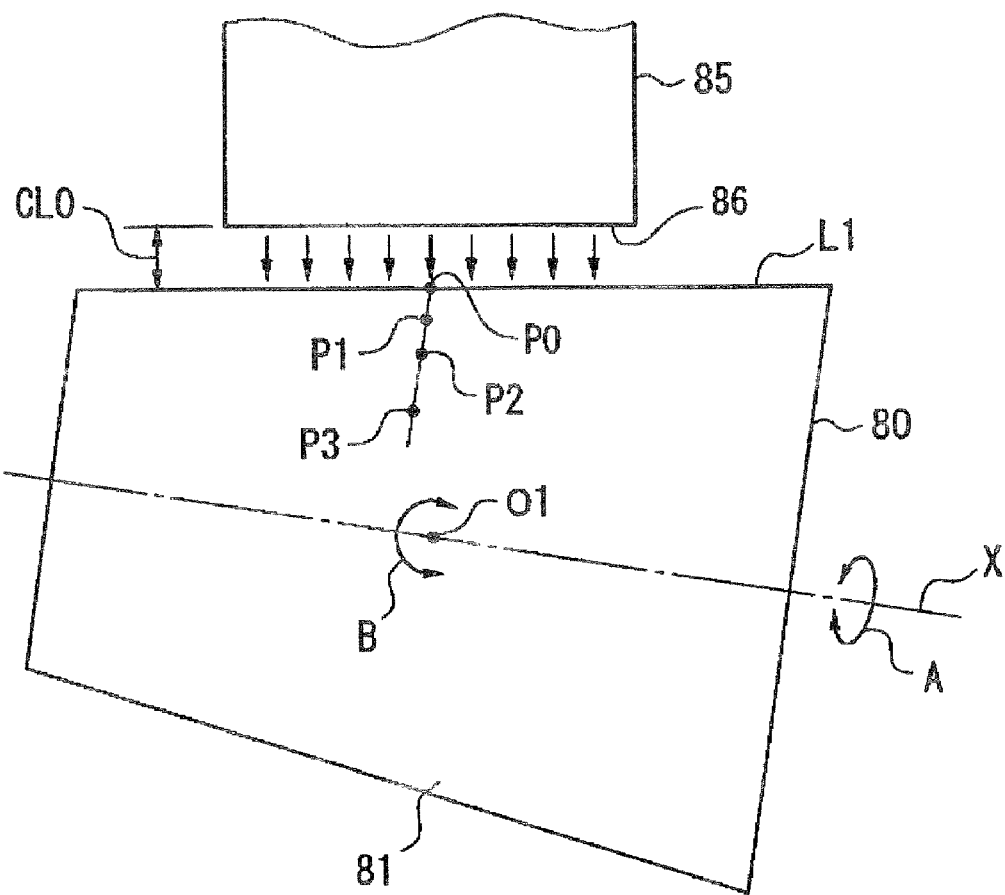
FIG. 5 is a schematic side view illustrating the relation between a printer head and a print substrate in the printer shown in FIG. 1.

In the state where the printer head 85 and the print substrate 80 are positioned such that the bottom 86 (nozzles for ejecting ink) of the printer head 85 is spaced apart from the print point P0 by the predetermined printing distance CL0 and the bottom 86 and the print point P0 are squarely faced to each other as shown in FIG. 5, ink is ejected through the nozzles of the bottom 86 of the printer head 85, as shown by arrows in FIG. 5, according to the control by the printing controller to perform printing on an area along the print point P0 (area along the ridge line L1 passing through the print point P0). For example, to print along a circumferential direction on the surface of the print substrate 80, the printing controller controls to change the aforementioned position for supporting the print substrate 80 by the supporting device while maintaining such a positional relation that each of points P1, P2, P3 . . . along the circumferential direction on the outer surface of the print substrate 80 is squarely faced to the bottom 86 (nozzles for ejecting ink) of the printer head 85 and is spaced by the predetermined printing distance CL0.

In the case of the print substrate 80 having a truncated cone shape as mentioned above, the control is conducted to eject ink through all of the ink nozzles while maintaining the bottom 86 formed with a plurality of ink nozzles of the printer head 85 to extend parallel with the ridge line L1 and spaced apart form the ridge line L1 by the predetermined printing distance CL0 as shown in FIG. 5. Accordingly, excellent printing along the ridge line L1 and over a wide area corresponding to the width of the printer head 85 is conducted.

Figure 6:
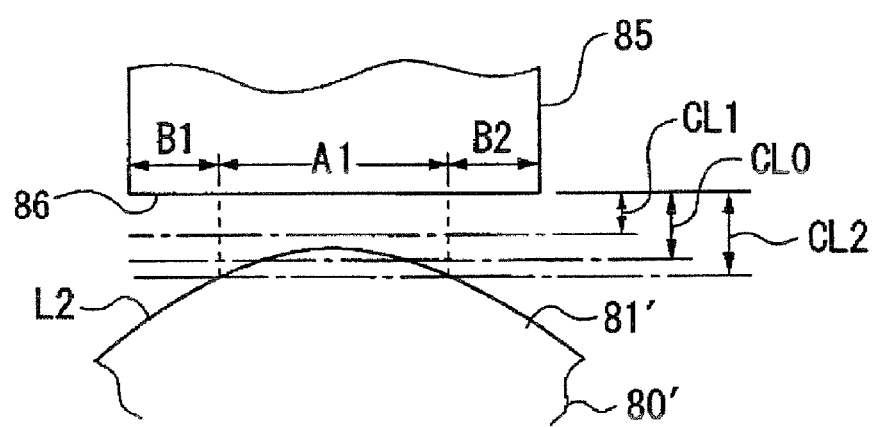
FIG. 6 is a schematic side view for explaining the control for ink ejection from the printer head in case of a print substrate having a curved surface.

However, in case of a print substrate 80' having a curved surface 81' as shown in FIG. 6, the distance between the bottom 86 of the printer head 85 and the surface L2 facing the bottom 86 is not constant and varies. In this case, some portions (areas) of the surface L2 may not set to have the predetermined printing distance CL0 relative to the bottom 86. For this case, it is controlled such that the portion (area) facing the center of the bottom of the printer head 85 is positioned in an allowable range of the predetermined printing distance CL0, i.e. a range at least CL1 (=CL0−α) and at most CL2 (=CL0+α) and that only some of the nozzles in a region corresponding to the aforementioned portion (area) eject ink. For example, in a state that the print substrate 80' is positioned relative to the printer head 85 as shown in FIG. 6, ink ejection nozzles only in a bottom region A1 of the printer head 85 corresponding to a portion (area) within the allowable range of the predetermined printing distance CL0 of at least CL1 and at most CL2 are controlled to eject ink and ink ejection nozzles in both side regions B1, B2 are controlled not to eject ink. In other words, a printing controller controls ejection of the ink from the plural ink nozzles according to a surface curvature of the surface to be printed and a relative position of said holding unit and said printer head. Therefore, printing is conducted only on a portion (area) of which printing distance is in the range enabling the optimum printing can be performed on the surface of the print substrate 80', thereby conducting excellent printing control without deteriorating the printing quality.

In stead of the ink ejection control within the allowable range of the printing distance as mentioned above, the amount and speed of ink ejection in the regions B1, B2 out of the allowable range of the predetermined printing distance CL0 of at least CL1 and at most CL2 may be controlled according to actual distances not to deteriorate the printing quality by the ink ejection in the regions B1, B2. For example, the ink ejection amount may be increased or the ink ejection speed may be increased according to increase in the distance from the bottom 86 of the printer head 85 so as to overcome the adverse affect by increase of the distance and to maintain the printing quality.

A concrete example arrangement of a printer capable of performing the three-dimensional printing according to the operation principle as described above will be described with reference to FIG. 2 through FIG. 4. This printer has a base 1 and a gate-like supporting frame 2. The gate-like supporting frame 2 is fixed on the base 1 and comprises a pair of left and right supporting legs 2a, 2b and a supporting beam 2c connecting the upper ends of the supporting legs 2a, 2b and extending in a lateral direction. The printer also has a first controller 6 with an operator control panel 6a which is adjacent to the right supporting leg 2b and a second controller 7 with a maintenance station 8 which is adjacent to the left supporting leg 2a. The first and second controllers 6, 7 comprise various controllers such as a movement controller for controlling the movement and rotation of the respective components as will be described later, a printing controller for controlling the ejection of ink from the printer head, and a power controller.

A pair of front and rear lateral guide rails 3a, 3b are mounted to extend in the lateral direction (direction of the axis Y) on the upper surface of the supporting beam 2c and a printer head carriage 4 is mounted on the lateral guide rails 3a, 3b such that the printer head carriage 4 is movable in the lateral direction (i.e. movable in the direction shown by arrow D(y)). To allow the movement of the printer head carriage 4 in the lateral direction, a traveling mechanism such as a ball screw mechanism is provided. By controlling the driving of the traveling mechanism, the lateral movement of the printer head carriage 4 can be controlled. Since such traveling mechanism is well known in the art, the description of the structure will be omitted.

The printer head carriage 4 is a member which extends forward from a portion supported by the lateral guide rails 3a, 3b, is bent downward, and extends forward again, that is, the printer head carriage 4 has a crank shape as seen from a side. Mounted on a front end portion 4a of the printer head carriage 4 is a plurality of printer head modules 5. The printer head modules 5, also called inkjet head modules, are each provided with a number of ink nozzles formed in the bottom thereof and, for example, eject respective inks of different colors from the ink nozzles. The control of ink ejection is conducted by the printing controller for every ink nozzle. Since such control is conventionally well known in the art, the description of the structure will be omitted.

Figure 2:
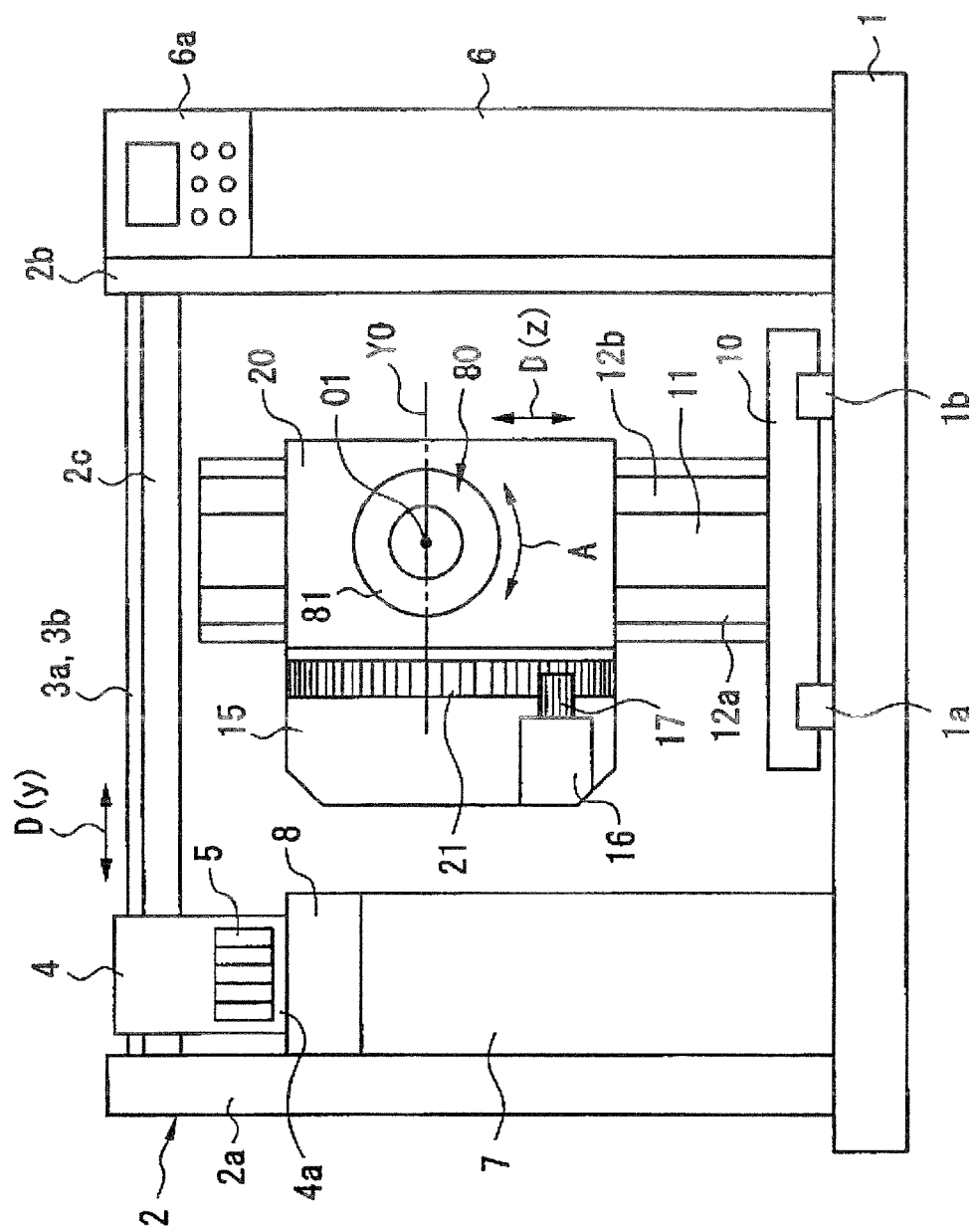
FIG. 2 is a front view of a printer according to an embodiment of the present invention.

The printer head carriage 4 with the printer head modules 5 is movable along the lateral guide rails 3a, 3b in the lateral direction. In a state that the printer head carriage 4 is at the leftmost position as shown in FIG. 2, the maintenance station 8 is moved upward to prevent the ink nozzles in the bottoms of the printer head modules 5 from being dried and to clean the ink nozzles.

A pair of anteroposterior guide rails 1a, 1b extending in the anteroposterior direction (direction of the axis X) are arranged on the base 1 between the left and right supporting legs 2a, 2b of the gate-like supporting frame 2. A first supporting member 10 is mounted such that the first supporting member 10 is movable along the anteroposterior guide rails 1a, 1b in the anteroposterior direction (i.e. movable in the direction shown by the arrow D(x)). To allow the movement of the first supporting member 10 in the anteroposterior direction, a traveling mechanism such as a ball screw mechanism is provided. By controlling the driving of the traveling mechanism, the anteroposterior movement of the first supporting member 10 can be controlled. Since such traveling mechanism is well known in the art, the description of the structure will be omitted.

A vertical supporting member 11 is fixed in a vertically standing state on the first supporting member 10. Attached to the front surface of the vertical supporting member 11 are a pair of vertical guide rails 12a, 12b extending in the vertical direction (the direction of the axis Z). A second supporting member 15 is mounted to and supported by the vertical guide rails 12a, 12b such that the second supporting member 15 is movable in the vertical direction (i.e. movable in the direction shown by the arrow D(z)). To allow the movement of the second supporting member 15 in the vertical direction, a traveling mechanism such as a ball screw mechanism is provided. By controlling the driving of the traveling mechanism, the vertical movement of the second supporting member 15 can be controlled. Since such traveling mechanism is well known in the art, the description of the structure will be omitted.

The front surface 15a of the second supporting member 15 is formed into a semicylindrical shape of which center is a first rotation axis Y0 extending in the direction of the axis Y passing through a prescribed point O1 (a point set to a position where the print substrate 80 will be positioned as will be described later) defined relative to the second supporting member 15. A third supporting member 20 has a rear surface 20a having a semicylindrical shape corresponding to the semicylindrical shape of the front surface 15a. The third supporting member 20 is disposed slidably along the front surface 15a. That is, the rear surface 20a of the third supporting member 20 is movable and slidable relative to the front surface 15a of the second supporting member 15, thereby allowing the third supporting member 20 to rotate about the first rotation axis Y0 relative to the second supporting member 15 (i.e. rotate in the direction shown by the arrow B). According to this structure, the first rotation axis Y0 as the center of rotation of the third supporting member 20 is positioned in a hollow space inside the third supporting member 20 so that the print substrate 80 can be supported in the hollow space. That is, the first rotation axis Y0 is located at a position passing through the print substrate 80.

To move the third supporting member 20 to rotate about the first rotation axis Y0 relative to the second supporting member 15, the third supporting member 20 is provided with internal teeth 21 which are formed in a front surface of a left-side portion, in FIG. 2, thereof and of which center is the first rotation axis Y0. A driving motor 16 is mounted on a front surface of a left-side portion of the second supporting member 15 and is provided with a driving pinion 17 attached to a driving shaft thereof. The driving pinion 17 is meshed with the internal teeth 21. As the driving pinion 17 is driven to rotate by the driving motor 16, the internal teeth 21 meshed with the driving pinion 17 are driven to rotate, thereby rotating the third supporting member 20 about the first rotation axis Y0.

A holding shaft 25 extends in the anteroposterior direction (the direction of the axis X) and projects forward from the front surface of the third supporting member 20 in such a manner that the holding shaft 25 is rotatable about a second rotation axis X0 passing through the aforementioned prescribed point O1. A holding chuck 26 for holding the print substrate is attached to the front end of the holding shaft 25. The holding shaft 25 is driven to rotate by a driving motor (not shown) which is disposed within the third supporting member 20 and the holding chuck 26 has a structure capable of holding the print substrate 80. As the holding shaft 25 is driven to rotate with the print substrate 80 held by the holding chuck 26, the print substrate 80 is rotated about the second rotation axis X0. As can be understood from this, the second rotation axis X0 is located at a position passing through the print substrate 80.

Figure 3:
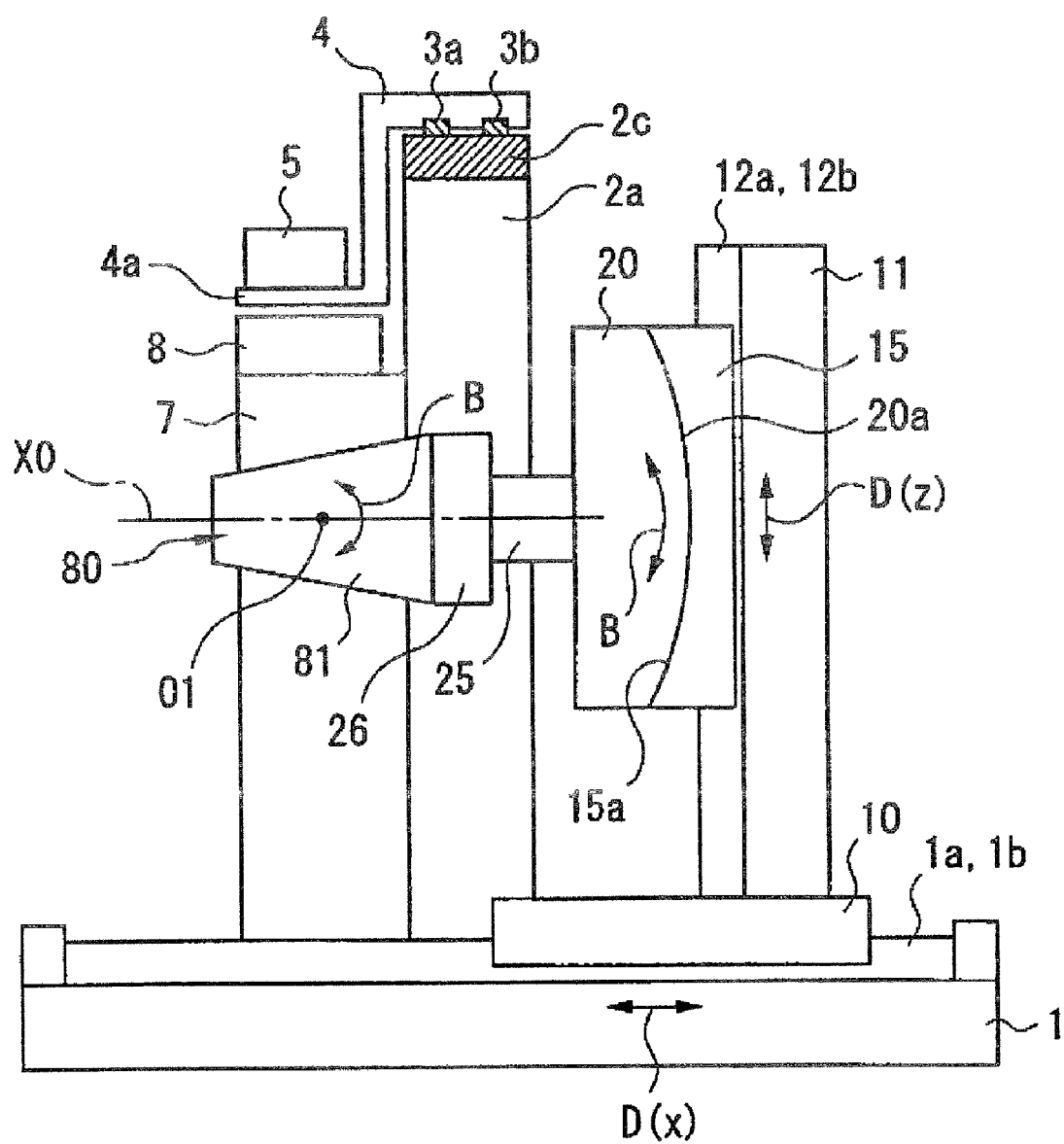
FIG. 3 is a side view of the printer shown in FIG. 2.

The second rotation axis X0 extends in the anteroposterior direction (the direction of the axis X) when the third supporting member 20 is positioned at a predetermined rotational position (the rotational position shown in FIG. 3). Since the third supporting member 20 is rotatable about the first rotation axis Y0 as mentioned above, the second rotational axis X0 is inclined upward or downward according to the rotational position of the third supporting member 20. Accordingly, the print substrate 80 is moved to rotate. Though the first rotation axis Y0 and the second rotation axis X0 both pass the prescribed point O1 and intersect with each other in the illustrated example, these may not intersect with each other, that is, may be shifted from each other. However, the first rotation axis Y0 and the second rotation axis X0 preferably intersect with each other because the position calculation of the print substrate 80 is facilitated and the control by the movement controller is facilitated.

In the printer having the aforementioned structure, the second rotation axis X0 as the rotation center of the holding shaft 25 corresponds to the axis X in the arrangement for explaining the operation principle shown in FIG. 1 and the first rotation axis Y0 as the rotation center of the third supporting member 20 corresponds to the axis Y in the arrangement for explaining the operation principle shown in FIG. 1. The second supporting member 15 supporting the third supporting member 20 is supported by the first supporting member 10 in such a manner as to allow the second supporting member 15 to move in the direction of the axis Z (the vertical direction) (i.e. to move in the direction shown by the arrow D(z)) and the first supporting member 10 is supported on the base 1 in such a manner as to allow the first supporting member 10 to move in the direction of the axis X (the anteroposterior direction) (i.e. to move in the direction shown by the arrow D(x)). In addition, the printer head is supported above the print substrate 80 in such a manner as to allow the printer head to move in the direction of the axis Y (the lateral direction) relative to the base 1 (i.e. to move in the direction shown by the allow D(y)). That is, the printer is adapted to perform the same actions as those explained in the operation principle as shown in FIG. 1.

Figure 4:
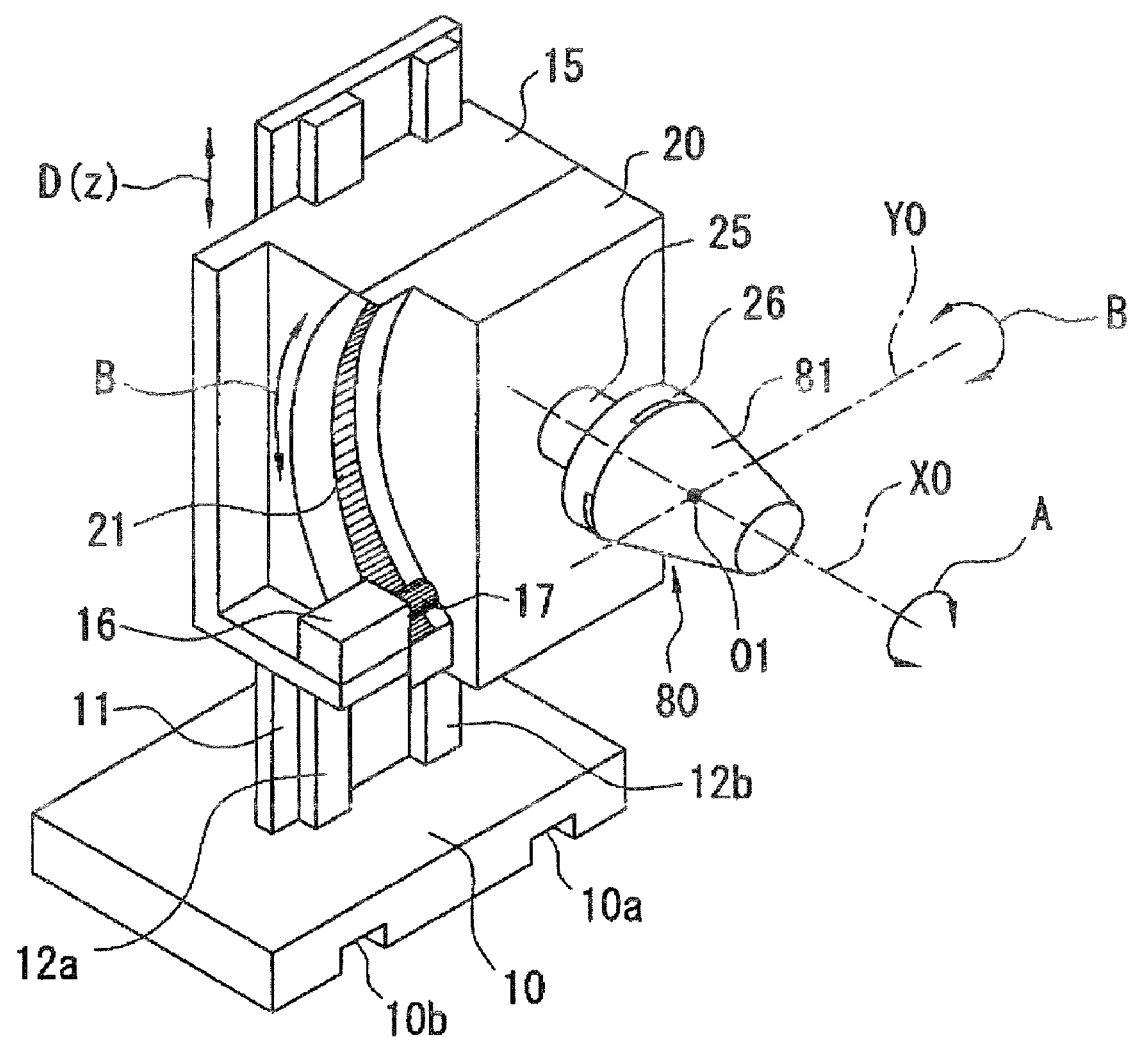
FIG. 4 is a perspective view showing a part of the printer shown in FIG. 2.

As apparent from the above description, the printer as shown in FIG. 2 through FIG. 4 can perform the intended printing by ejecting ink from the ink nozzles formed in the bottom of the printer head modules 5 onto the surface 81 of the print substrate 80 according to the operation principle explained with reference to FIG. 1. Though an example in which the printing is performed on the surface of the print substrate 80 having a truncated cone shape has been explained with reference to FIG. 1, the configuration of the print substrate is not limited thereto and the printing can be performed on any curved surface including a cylindrical surface and a spherical surface. In this case, ejection control is conducted to obtain excellent printing quality regardless of any curvature by changing the region of nozzles to be used among a plurality of nozzles of the printer head and/or controlling the ejection amount and/or ejection speed of ink ejected from the nozzles.

Though the first rotation axis Y0 and the second rotation axis X0 intersect with each other at the prescribed point O1 in this printer, the prescribed point O1 is located at a position passing through the print substrate 80 held by the holding chuck 26, that is, a position in a hollow space inside the printer. By rotating the third supporting member 20 about the first rotation axis Y0 and rotating the holding chuck 26 about the second rotation axis X0, the print substrate 80 is moved to rotate about the prescribed point O1. Accordingly, the moving range of the print substrate 80 can be reduced to the minimum. This enables a printer having a small (compact) structure and enables easy operation control.

According to the printer having the aforementioned structure, the holding unit and the printer head are controlled to move relative to each other in the three-dimensional space by the movement controller and, during this, the ink ejection from the printer head is controlled by the printing controller according to the controlled movement of the holding unit and the printer head, thereby easily and automatically performing the intended printing on the surface of the print substrate having a three-dimensional profile. During this, the movement controller is adapted to control the aforementioned relative movement while maintaining a positional relation between said printer head and said print substrate held by the holding unit such that ink nozzles of the printer head and a portion to be printed of the print substrate face each other and are spaced apart from each other by the predetermined printing distance and that ink ejected from said ink nozzles perpendicularly collides with the surface of the portion to be printed, thereby enabling the most effective ejection of ink from the ink nozzles to apply the ink to the portion to be printed on the surface of the print substrate and thus enabling precise and excellent printing relative to a three-dimensional surface.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A printer comprising:
    a holding unit configured to hold a print substrate having a surface to be printed;
    a printer head configured to eject ink from a plurality of ejection nozzles to the surface;
    a primary supporting member having a front surface having a semicylindrical shape;
    a secondary supporting member having a rear surface formed to correspond to said front surface of said primary supporting member, said secondary supporting member being slidably mounted to said front surface of said primary supporting member, said holding unit being supported by said secondary supporting member;
    a movement controller configured to move said holding unit and said printer head relative to each other; and
    a printing controller configured to control ejection of the ink from the printer head according to a surface curvature of the surface and a relative position of said holding unit and said printer head.

2. The printer according to claim 1, wherein said printing controller is configured to control a number of ejection nozzles which actually eject ink.

3. The printer according to claim 1, wherein said printing controller is configured to control ejection speed and/or an ejection amount of the ink ejected from said plurality of ejection nozzles according to the surface curvature of the surface.

4. The printer according to claim 1, wherein said movement controller is configured to move the holding unit and the printer head relatively so that a distance between the plurality of ejection nozzles and the surface to be printed is kept at a predetermined distance and so that the ink ejected from the plurality of ejection nozzles collides with the surface substantially perpendicularly.

5. The printer according to claim 1, wherein said printing controller is configured to control the ejection of the ink from the printer head according to a distance between the plurality of ejection nozzles and the surface to be printed.

6. The printer according to claim 1, wherein the printing controller is configured to control speed of the ink ejected from the printer head according to a distance between the plurality of ejection nozzles and the surface to be printed.

7. The printer according to claim 1, wherein the printing controller is configured to control a size of ink droplet ejected from the printer head according to a distance between the plurality of ejection nozzles and the surface to be printed.

8. The printer according to claim 1, wherein the printing controller is configured to control the printer head to eject ink if a distance between the plurality of ejection nozzles and the surface to be printed is within a predetermined range.

9. The printer according to claim 1, wherein the printing controller is configured to increase a speed of the ink ejected from the printer head as a distance between the plurality of ejection nozzles and the surface to be printed increases.

10. The printer according to claim 1, wherein the printing controller is configured to increase an amount of ink to be ejected from the printer head as a distance between the plurality of ejection nozzles and the surface to be printed increases.

11. The printer according to claim 1,
wherein a supporting device supports said holding unit and said printer head such that said holding unit and said printer head are movable relative to each other in directions of axes X, Y, and Z which are substantially perpendicular to each other, said holding unit being rotatable about the axis X and the axis Y relative to said printer head, and
wherein said movement controller is configured to control said holding unit and said printer head to move relative to each other in the direction of said axes X, Y, and Z and control said holding unit to rotate about said axis X and said axis Y relative to said printer head.

12. The printer according to claim 11, wherein said supporting device comprises:
a first supporting member supported on a base such that said first supporting member is movable in the direction of the axis X extending in a horizontal plane direction;
said primary supporting member that is supported on said first supporting member such that said primary supporting member is movable in the direction of the axis Z extending in a direction substantially perpendicular to said horizontal plane direction; and
said secondary supporting member that is supported on said primary supporting member such that said secondary supporting member is rotatable about a first rotation axis extending in the direction of the axis Y substantially perpendicular to the directions of said axis X and said axis Z,
wherein said holding unit is supported on said secondary supporting member such that the holding unit is rotatable about a second rotation axis extending in a plane substantially perpendicular to the first rotation axis to hold the print substrate; and
wherein said printer head is disposed on said base to extend above the print substrate, held by said holding unit, such that said printer head is movable in the direction of the axis Y.

13. The printer according to claim 1, wherein the surface to be printed has a three-dimensional surface.

14. The printer according to claim 1, further comprising a driving motor provided on said primary supporting member, said driving motor having a driving pinion,
wherein teeth are formed in a front surface of said secondary supporting member, said teeth meshing with said driving pinion.

15. A printer comprising:
holding means for holding a print substrate having a surface to be printed;
printer head means for ejecting ink from a plurality of ejection nozzles to the surface;
means for supporting said holding means, said means for supporting including a primary supporting member having a front surface having a semicylindrical shape, said means for supporting further including a secondary supporting member having a rear surface formed to correspond to said front surface of said primary supporting member, said secondary supporting member being slidably mounted to said front surface of said primary supporting member, said holding means being mounted to said secondary supporting member;
movement controller means for moving said holding means and said printer head means relative to each other; and
printing controller means for controlling ejection of the ink from the printer head means according to a surface curvature of the surface and a relative position of said holding means and said printer head means.

16. A printing method comprising:
holding a print substrate having a surface to be printed using a holding unit;
ejecting ink from a plurality of ejection nozzles to the surface;
providing a primary supporting member having a front surface having a semicylindrical shape;
supporting the holding unit using a secondary supporting member, the secondary supporting member having a rear surface formed to correspond to the front surface of the primary supporting member, the secondary supporting member being slidably mounted to the front surface of the primary supporting member;
moving said print substrate held and said plurality of ejection nozzles relative to each other; and
controlling ejection of the ink from the plurality of ejection nozzles according to a surface curvature of the surface and a relative position of said print substrate held and said plurality of ejection nozzles.

17. A three-dimensional printer comprising:
a holding unit configured to hold a print substrate having a three-dimensional surface to be printed;
a printer head configured to eject ink from a plurality of ejection nozzles to the three-dimensional surface;
a primary supporting member having a front surface having a semicylindrical shape;
a secondary supporting member having a rear surface formed to correspond to said front surface of said primary supporting member, said secondary supporting member being slidably mounted to said front surface of said primary supporting member, said holding unit being supported by said secondary supporting member;

a movement controller configured to move said holding unit and said printer head relative to each other; and a printing controller configured to control ejection of the ink from the printer head according to a surface curvature of the three-dimensional surface and a relative position of said holding unit and said printer head.

18. The three-dimensional printer according to claim 17, further comprising a driving motor provided on said primary supporting member, said driving motor having a driving pinion, wherein teeth are formed in a front surface of said secondary supporting member, said teeth meshing with said driving pinion.

* * * * *